United States Patent
Lowe

(10) Patent No.: US 10,595,182 B1
(45) Date of Patent: Mar. 17, 2020

(54) MANAGING SHORT-RANGE WIRELESS COMMUNICATIONS (SRWC) AT A VEHICLE

(71) Applicant: General Motors LLC, Detroit, MI (US)

(72) Inventor: Dexter C. Lowe, Macomb, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 0 days.

(21) Appl. No.: 16/109,013

(22) Filed: Aug. 22, 2018

(51) Int. Cl.
H04W 4/48 (2018.01)
H04W 4/80 (2018.01)
H04M 1/60 (2006.01)
H04B 5/00 (2006.01)

(52) U.S. Cl.
CPC .............. H04W 4/80 (2018.02); H04B 5/0031 (2013.01); H04M 1/6091 (2013.01)

(58) Field of Classification Search
CPC .................................. H04W 4/80; H04W 4/48
See application file for complete search history.

(56) References Cited

U.S. PATENT DOCUMENTS

| 2010/0109901 A1* | 5/2010 | Martin-Cocher | G06Q 30/0251 379/45 |
| 2010/0321206 A1* | 12/2010 | Kuga | G01C 21/3679 340/905 |
| 2015/0208194 A1* | 7/2015 | Ito | H04W 4/046 455/41.2 |

* cited by examiner

Primary Examiner — Tuan H Nguyen
(74) Attorney, Agent, or Firm — Reising Ethington P.C.; David Willoughby

(57) ABSTRACT

A system and method of managing short-range wireless communications (SRWC) at a vehicle, the method being carried out by vehicle electronics of the vehicle, wherein the method includes: detecting a vehicle SRWC initiation event; in response to the detection of the vehicle SRWC initiation event, sending a user data stream availability request to a remote facility; receiving a user data stream availability response from the remote facility; during a time between the detecting and receiving steps, operating a wireless communication device in an initial mode that suspends or forgoes transmission of SRWC connection message(s) pursuant to a SRWC service; determining whether to enable or disable use of the SRWC service at the wireless communications device based on the user data stream availability response; and when it is determined to enable use of the SRWC service at the wireless communications device, transmitting a SRWC connection message pursuant to the SRWC service.

17 Claims, 2 Drawing Sheets

MANAGING SHORT-RANGE WIRELESS COMMUNICATIONS (SRWC) AT A VEHICLE

INTRODUCTION

The present invention relates to managing availability of a short-range wireless communication (SRWC) connection at a vehicle based on remote data availability.

Vehicles include hardware and software capable of obtaining and processing various information, including information that is obtained by vehicle system modules (VSMs). Moreover, vehicles include networking capabilities and can be connected to a vehicle backend server that maintains accounts for users and their vehicles, and that can be used to obtain data.

SUMMARY

According to one aspect of the invention, there is provided a method of managing short-range wireless communications (SRWC) at a vehicle, the method being carried out by vehicle electronics of the vehicle, wherein the method includes: detecting a vehicle SRWC initiation event, the SRWC initiation event being a state transition of the vehicle from a powered off state to a powered on state; in response to the detection of the vehicle SRWC initiation event, sending a user data stream availability request to a remote facility, the user data stream availability request being sent over a wireless carrier system using a telematics unit installed as a part of the vehicle electronics of the vehicle; after sending the user data stream availability request to the remote facility, receiving a user data stream availability response from the remote facility; during a time between the detecting and receiving steps, operating a wireless communication device in an initial mode that suspends or forgoes transmission of SRWC connection message(s) pursuant to a SRWC service, wherein each of the SRWC connection message(s) indicates an availability for an SRWC device to connect to the wireless communications device, and wherein the wireless communications device is installed as a part of the vehicle electronics of the vehicle; determining whether to enable or disable use of the SRWC service at the wireless communications device based on the user data stream availability response; and when it is determined to enable use of the SRWC service at the wireless communications device, transmitting a SRWC connection message using the wireless communications device pursuant to the SRWC service.

According to various embodiments, this method may further include any one of the following features or any technically-feasible combination of some or all of these features:
  the vehicle SRWC initiation event is a state transition of the vehicle from a powered off state to an ignition on state;
  the user data stream availability request is sent to the remote facility after establishing a remote data connection with the remote facility, the remote facility being a backend vehicle services facility;
  initiating the wireless communications device in response to the vehicle SRWC initiation event, and wherein the wireless communications device is initiated into the initial mode such that SRWC communications are suspended;
  the initial mode enables the reception of wireless messages at the wireless communications device using the SRWC service;
  the initial mode includes suspending or forgoing SRWC communications with non-vehicle SRWC devices while carrying out SRWC communications with vehicle SRWC devices;
  the user data stream availability response is generated by the remote facility in response to querying a database as to a status or existence of a remote data connectivity subscription for the vehicle or a vehicle user, the vehicle user being an individual or entity previously associated with the vehicle;
  the user data stream availability response includes the status or an indicator of the existence of the remote data connectivity subscription for the vehicle or the vehicle user;
  the SRWC connection message includes an identifier of the wireless communications device;
  the SRWC connection message includes a service set identifier (SSID) pertaining to the wireless communications device;
  the SRWC service uses an IEEE 802.11 protocol; and/or
  providing a second SRWC service during the time between the detecting and receiving steps, wherein the second SRWC service is a Bluetooth™ service.

According to another aspect of the invention, there is provided a method of managing short-range wireless communications (SRWC) at a vehicle, the method being carried out by vehicle electronics of the vehicle and the method including: detecting a vehicle SRWC initiation event; receiving a user data stream availability message from a remote facility, wherein the user data stream availability message is generated by the remote facility based on whether the vehicle or a vehicle user is associated with an active remote data connectivity subscription such that the vehicle is permitted to provide a remote data connectivity stream for a non-vehicle handheld wireless device (HWD) of the vehicle user; in response to the detection of the vehicle SRWC initiation event, determining whether to enable or disable use of a SRWC service at a wireless communications device based on the user data stream availability message, wherein the wireless communications device is installed as a part of the vehicle electronics of the vehicle; and when it is determined to enable use of the SRWC service at the wireless communications device, transmitting a SRWC connection message as a part of the SRWC service using the wireless communications device.

According to various embodiments, this method may further include any one of the following features or any technically-feasible combination of some or all of these features:
  the user data stream availability message is received at the vehicle in response to a change in a status of the remote data connectivity subscription, wherein a current status indicator of the status of the remote data connectivity subscription is stored in memory of the vehicle electronics, and wherein the determining step is based on the current status indicator;
  sending a user data stream availability request to a remote facility, and wherein the user data stream availability message is a the user data stream availability response that is sent after sending the user data stream availability request to the remote facility;
  establishing a SRWC connection with the non-vehicle HWD in response to the transmitting step, and wherein the SRWC connection is secured using pre-shared or predetermined security information, the pre-shared or predetermined security information being known to the non-vehicle HWD and the vehicle electronics prior to carrying out the method;

data is downloaded and/or uploaded by the non-vehicle HWD using the SRWC connection and a remote data connection established between a remote server and a telematics unit using a wireless carrier system, the telematics unit being installed as a part of the vehicle electronics of the vehicle;

the telematics unit and the wireless communications device are incorporated into a single vehicle system module (VSM);

when it is determined to enable use of the SRWC service at the wireless communications device, suspending or forgoing all SRWC communications with the non-vehicle HWD while permitting SRWC communications with vehicle SRWC device(s); and/or the vehicle SRWC initiation event is detected when a user approaches the vehicle with a passive entry passive start (PEPS) vehicle key or other passive vehicle key.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables a vehicle to manage short-range wireless communications (SRWC) in response to a message received from a remote facility. In many embodiments, the message received indicates whether a remote data connection is presently offered using a telematics unit of the vehicle. The message can be used to direct a wireless communications device at the vehicle to disable or enable certain SRWC service(s). For example, in one embodiment, the message can indicate that no remote data connection is available for the vehicle (or the vehicle user) and, thus, the vehicle can determine (or can be directed by the message) to disable a particular SRWC service, such as Wi-Fi™, or to disable SRWC service(s) for non-vehicle SRWC devices. A remote data connection can be provided to a vehicle user when the vehicle user or vehicle is associated with an active remote data connectivity subscription. When this subscription is active, a vehicle user can use the telematics unit of the vehicle as well as an SRWC connection with the vehicle to download data from and upload data to their personal devices, such as a handheld wireless device (HWD) (e.g., smartphone, laptop, tablet).

However, when the vehicle is not configured to provide remote data connectivity for the vehicle or the vehicle user, it may be desirable to disable certain SRWC services provided by the vehicle so as to not establish a SRWC connection with a HWD of the vehicle user that will not or will likely not be used. For example, the wireless communications device of the vehicle can offer a Wi-Fi™ connection (e.g., Wi-Fi™ hotspot) as well as Internet (or other remote network) access via the telematics unit so that the HWD (or other SRWC device) can access remote networks via the Wi-Fi™ connection and a remote data connection provided by the telematics unit. When the remote data connection is not available, the Wi-Fi™ connection may not be desirable, at least in some embodiments. Thus, the vehicle can receive a message from a remote facility (e.g., a vehicle backend services facility) that indicates whether the remote data connection is available (or whether to enable/disable the Wi-Fi™). In response to receiving this message, the vehicle can disable or suspend Wi-Fi™ activity (or other SRWC service(s)). In some embodiments, other SRWC services can still be offered at the vehicle even for non-vehicle SRWC devices; for example, a Bluetooth™ or Bluetooth™ Low Energy (BLE) connection can be established between the wireless communications device and the HWD so that a user can stream music or carry out other vehicle-HWD functionality (e.g., use vehicle-user interfaces for carrying out telephone calls). In other embodiments, other SRWC activity can be suspended as well, such as all SRWC activity for non-vehicle SRWC devices or other SRWC services.

Figure 1:
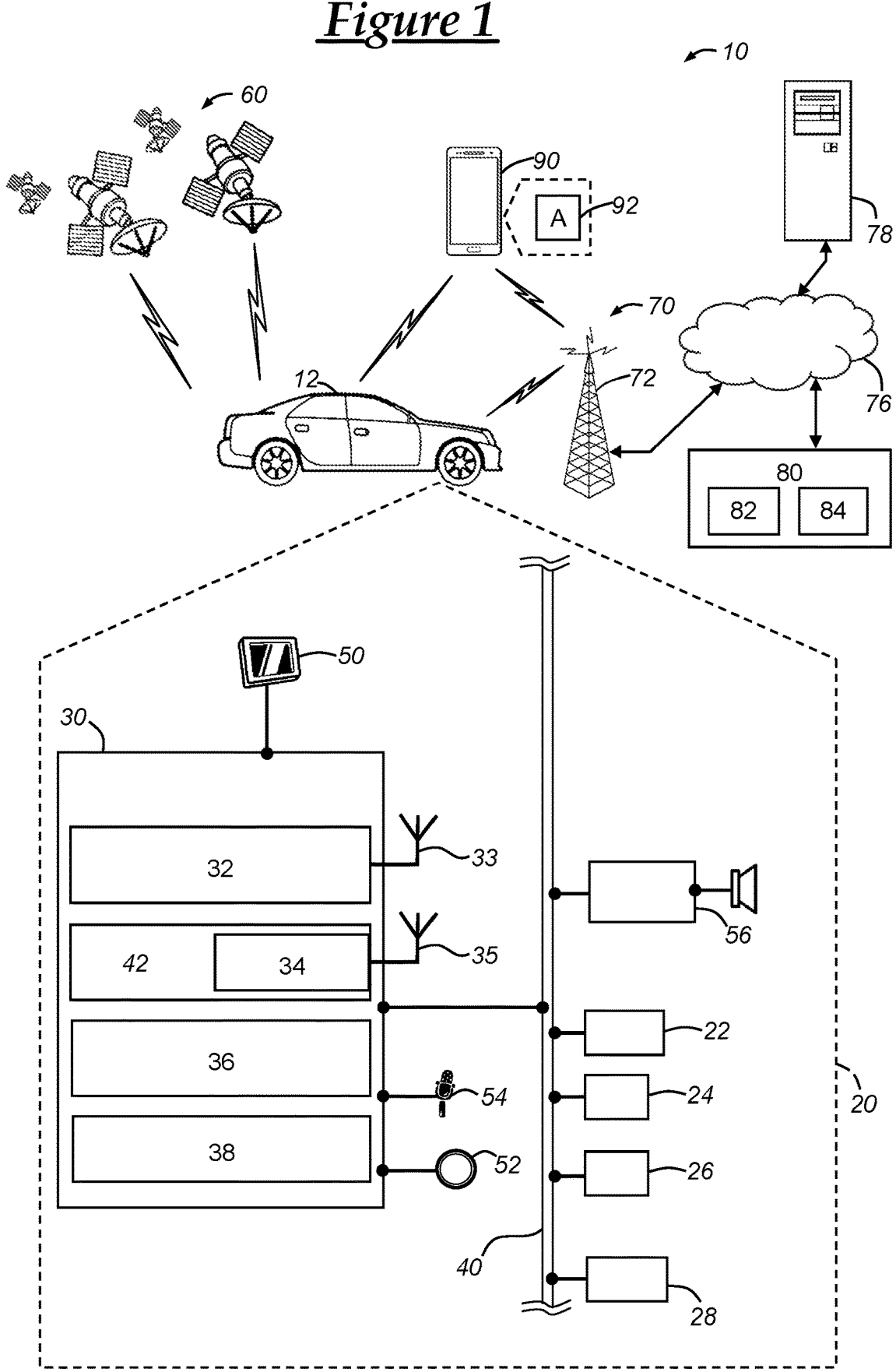
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12, a constellation of global navigation satellite system (GNSS) satellites 60, one or more wireless carrier systems 70, a land communications network 76, a computer or server 78, and a vehicle backend services facility 80. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally in FIG. 1 and includes a global navigation satellite system (GNSS) receiver 22, a body control module or unit (BCM) 24, an engine control module (ECM) 26, other vehicle system modules (VSMs) 28, a wireless communications device 30, and vehicle-user interfaces 50-56. Some or all of the different vehicle electronics may be connected for communication with each other via one or more communication busses, such as communications bus 40. The communications bus 40 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as the GNSS receiver 22, BCM 24, ECM 26, wireless communications device 30, a telematics unit 42 (shown in FIG. 1 as included as a part of the wireless communications device 30), and vehicle-user interfaces 50-56, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 can be connected by communications bus 40 to the other VSMs, as well as to the wireless communications device 30, and can be programmed to run vehicle system and subsystem diagnostic tests. Moreover, each of the VSMs can include and/or be communicatively coupled to suitable hardware that enables intra-vehicle communications to be carried out over the communications bus 40; such hardware can include, for example, bus interface connectors and/or modems. One or more VSMs 28 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives GNSS signals from a constellation of GNSS satellites 60. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. In either implementation, GNSS receiver 22 can include at least one processor and memory, including a non-transitory computer readable memory storing instructions (software) that are accessible by the processor for carrying out the processing performed by the receiver 22.

The GNSS receiver 22 may be used to provide navigation and other position-related services to the vehicle operator. Navigation information can be presented on the display 50 (or other display within the vehicle) or can be presented verbally such as is done when supplying turn-by-turn navigation. The navigation services can be provided using a dedicated in-vehicle navigation module (which can be part of GNSS receiver 22 and/or incorporated as a part of wireless communications device 30 or other VSM), or some or all navigation services can be done via the wireless communications device (or other telematics-enabled device) installed in the vehicle, wherein the position information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in a car sharing service. Also, new or updated map data can be downloaded to the GNSS receiver 22 from the remote facility 80 via the wireless communications device 30. In some embodiments, the GNSS receiver 22 may be integrated with or part of a center stack module (CSM) and/or integrated with the wireless communications device 30. Or, the GNSS receiver 22 may be a separate device that is connected to other VSMs via bus 40, as depicted in FIG. 1.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 40. In some embodiments, the BCM 24 may be integrated with or part of a center stack module (CSM) and/or integrated with wireless communications device 30. Or, the BCM may be a separate device that is connected to other VSMs via bus 40. The BCM 24 can include a processor and/or memory, which can be similar to processor 36 and memory 38 of wireless communications device 30, as discussed below. The BCM 24 may communicate with the wireless communications device 30 and/or one or more vehicle system modules, such as the engine control module (ECM) 26, telematics unit 42, display 50, audio system 56, or other VSMs. The BCM 24 may include a processor and memory accessible by the processor. Suitable memory may include non-transitory computer-readable memory that includes various forms of RAM and ROM, such as those discussed below with respect to memory 38 of the wireless communications device 30.

Software stored in the memory and executable by the processor of the BCM enables the BCM to direct one or more vehicle functions or operations including, for example, controlling central locking, air conditioning (or other HVAC functionality), power mirrors, controlling the vehicle primary mover (e.g., engine, primary propulsion system), and/or controlling various other vehicle modules. The BCM 24 can receive a request to carry out a particular vehicle function from the wireless communications device 30 (or telematics unit 42) and, in response, the BCM 24 can send signals to other VSMs, such as a request to perform a particular operation or a request for vehicle sensor data. When the BCM 24 requests information from a sensor, the sensor may then send back the requested information, which can then be forwarded from the BCM 24 to another VSM, such as the wireless communications device 30. As mentioned above, the BCM 24 may receive data from VSMs, such as GNSS data or other navigation-related date from GNSS receiver 22, externally-received data from the wireless communications device 30, and various other information or data from other VSMs.

The BCM 24 can be used to detect a vehicle SRWC initiation event, which is any event that indicates or causes the wireless communications device (or other vehicle SRWC device) to power on or otherwise become active (e.g., switch into a normal operating mode from a low power mode). In one embodiment, a vehicle SRWC initiation event can be when the vehicle state changes from a powered off state to a powered on state. As used herein, a "powered on state" is a state of the vehicle in which the ignition or primary propulsion system of the vehicle is powered on or the accessory electronics of the vehicle is supplied with electrical power (e.g., the key of the vehicle is in an accessory (ACC) position). And, as used herein, a "powered off state" is a state of the vehicle in which the ignition or primary propulsion system of the vehicle is not powered on. Also, as used herein, an "ignition on state" is a powered on state in which the vehicle ignition is started, or in which a primary propulsion of the vehicle is initiated or started, such as in the cases of an electric vehicle. Examples of vehicle SRWC initiation events include: when the vehicle receives an indication of a request (or desire) to connect from a non-vehicle SRWC device or other SRWC device; when the vehicle receives an indication that an operator or user approaches the vehicle; when the vehicle receives a SRWC signal (e.g., BLE signal) or a PEPS signal from a passive key or HWD that indicates a user is approaching the vehicle or otherwise desires to initiate the vehicle or the wireless communications device; and when the vehicle receives an indication to start the vehicle or switch into a powered on state.

Engine control module (ECM) 26 controls various aspects of engine operation, such as fuel ignition and ignition timing. The ECM 26 is connected to the communications bus 40 and may receive operation instructions (or vehicle commands) from the BCM 24 or other vehicle system modules, such as the wireless communications device 30 or other VSMs 28. In one scenario, the ECM 26 may receive a command from the BCM 24 to power on the vehicle (i.e., switch the vehicle to a powered on state). Moreover, the ECM 26 is an onboard vehicle sensor that can be used to obtain vehicle sensor information of the vehicle engine, such as from an engine speed sensor, an engine temperature sensor, and an engine ignition timing sensor, all of which are also onboard vehicle sensors. In embodiments when the vehicle is a hybrid or electric vehicle, the ECM 26 can be used to obtain status information regarding the primary mover (including electrical motor(s) and battery information).

The vehicle 12 includes various onboard vehicle sensors, as well as certain vehicle-user interfaces that can be utilized as onboard vehicle sensors. Generally, the sensors can use their respective sensor (or sensing device) to obtain vehicle sensor data, which can include vehicle sensor values as measured or determined by the onboard vehicle sensor. For example, the ECM 26 can include various sensors, such as engine speed sensor, an engine temperature sensor, and an engine ignition timing sensor. Other information pertaining to either the operating state of the vehicle (the "vehicle operating state") or the environment of the vehicle (the "vehicle environmental state") can also be obtained or may be included in the vehicle sensor data. The vehicle sensor data can be sent to other VSMs, such as BCM 24 and the wireless communications device 30, via communications bus 40. Also, in some embodiments, the vehicle sensor data (or other vehicle data) can be sent with metadata, which can include data identifying the sensor (or type of sensor) that captured the vehicle sensor data, a timestamp (or other time indicator), and/or other data that pertains to the vehicle sensor data or vehicle sensor. The "vehicle operating state" refers to a state of the vehicle concerning the operation of the vehicle, which can include the operation of the primary mover (e.g., a vehicle engine, vehicle propulsion motors). The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle.

Additionally, the vehicle 12 can include other sensors not explicitly mentioned above, including exhaust sensors, vehicle speed sensors, accelerometers, battery sensors, vision sensors (e.g., cameras, lidars), temperature sensors, HVAC-related sensors, parking sensors, lane change and/or blind spot sensors, lane assist sensors, ranging sensors (i.e., sensors used to detect the range between the vehicle and another object, such as through use of radar or lidar), radars, tire-pressure sensors, fluid level sensors (including a fuel level sensor), brake pad wear sensors, V2V communication unit (which may be integrated into the wireless communications device 30), and rain or precipitation sensors.

Wireless communications device 30 is capable of communicating data via short-range wireless communications (SRWC). In one embodiment, the wireless communications device 30 is a central vehicle computer that is used to carry out at least part of the method discussed below. In the illustrated embodiment, wireless communications device 30 includes an SRWC circuit 32, a telematics unit 42 (including a cellular chipset 34), a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), BCM 24, display 50, an infotainment module, a head unit, and/or a gateway module. In one embodiment, the wireless communications device 30 can be a part of an in-vehicle entertainment system that can be controlled through one or more vehicle-user interfaces, such as via touch-screen display 50, button 52, and/or microphone 54. In some embodiments, the device 30 can be implemented as an OEM-installed (embedded) or aftermarket device that is installed in the vehicle.

In one embodiment, the wireless communications device 30 includes the telematics unit 42 (or telematics control unit) (as shown in FIG. 1) that is capable of carrying out cellular communications using one or more cellular carrier systems 70. The telematics unit 42 can include the cellular chipset 34, software or firmware, processor, and memory. In one embodiment, the processor and/or memory of the telematics unit 42 can be shared with other VSMs or used for other functionality, such as for SRWC services which are carried out by the wireless communications device 30. For example, the telematics unit 42 can use the processor 36 and/or the memory 38 of the wireless communications device 30. Or, in other embodiments, a separate telematics unit can be included in the vehicle and communicatively coupled to the wireless communications device 30; this separate telematics unit can include the cellular chipset 34 as well as its own dedicated processor and memory (or these components can be shared with other VSMs). In one embodiment, the telematics unit can be integrated with the GNSS receiver 22 so that, for example, the GNSS receiver 22 and the wireless communications device 30 (or telematics unit 42) are directly connected to one another as opposed to being connected via communications bus 40.

In some embodiments, the wireless communications device 30 can be configured to communicate wirelessly according to one or more short-range wireless communications (SRWC) such as any of the Wi-Fi™, WiMAX™, Wi-Fi Direct™, IEEE 802.11p, other vehicle to vehicle (V2V) communication protocols, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit 32 may allow the device 30 to connect to another SRWC device, such as the handheld wireless device (HWD) 90 or other vehicles. In cases where the telematics unit 42 is included in the wireless communications device, the wireless communications device becomes user equipment (UE) usable in carrying out cellular communications via cellular carrier system 70.

The telematics unit 42 and/or the wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 (and/or telematics unit 42) can be configured with a static IP address or can be set up to automatically receive an assigned IP address from another device on the network such as a router or from a network address server.

Packet-switched data communications may also be carried out via use of a cellular network that may be accessible by the device 30 via the telematics unit 42. The cellular chipset 34 can enable data to be communicated over the wireless (or cellular) carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

The telematics unit 42 can provide a remote data connection to the vehicle. In one embodiment, the remote data connection can be used for vehicle services, such as reporting telemetry data concerning an operating status (e.g., diagnostic codes, other vehicle information concerning the vehicle operating state) to a backend vehicle services facility, such as remote facility 80. And, in some embodiments, the remote data connection (or a separate remote data connection) can be used to provide services for a vehicle user, such as for providing the vehicle user with remote data connectivity so that the vehicle user can connect their HWD 90 (or other non-vehicle SRWC device) with remote networks. In such a case, the vehicle can provide this remote data connection to the vehicle user when the vehicle user (or the vehicle) is associated with an active remote data connectivity subscription.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 (and/or telematics unit 42) or can be shared with other vehicle systems. The processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may be a non-transitory computer-readable medium, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives.

The wireless communications device 30 can provide an interface between various VSMs of the vehicle 12 and one or more devices external to the vehicle 12, such as one or more networks or systems at remote facility 80. This enables various vehicle operations to be carried out and/or monitored by "extra-vehicle" devices (or non-vehicle devices), including the vehicle backend services facility 80 and the HWD 90. For example, the wireless communications device 30 can receive vehicle sensor data from one or more onboard vehicle sensors. Thereafter, the vehicle can send this data (or other data derived from or based on this data) to other devices or networks, including the HWD 90 and the vehicle backend services facility 80. And, in another embodiment, the wireless communications device 30 can be incorporated with or at least connected to a navigation system that includes geographical map information including geographical roadway map data. The navigation system can be communicatively coupled to the GNSS receiver 22 (either directly or via communications bus 40) and can include an on-board geographical map database that stores local geographical map information.

In one embodiment, the wireless communications device can establish a remote data connection with a remote server using the cellular chipset 34 and the wireless carrier system 70. The vehicle can use this remote data connection to provide data to various VSMs of the vehicle, as well as to non-vehicle devices. In one embodiment, the vehicle can connect to another SRWC device, such as the HWD 90, and can provide remote data connectivity for the HWD 90. In this way, the vehicle (or the wireless communications device 30) acts as a hotspot for the HWD 90. A user of the vehicle can subscribe or be granted access to use of the vehicles telematics capabilities and/or remote data connectivity for downloading and uploading data with remote devices or networks (e.g., Internet access). As discussed more below, the vehicle can determine whether to provide a SRWC connection to the HWD 90 so that the HWD 90 can utilize the vehicle's remote data connectivity. This determination can be made at a remote server, such as at servers 82 of the remote facility 80.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information (e.g., monitoring information) and that can obtain vehicle sensor data. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one particular embodiment, audio system 56 is operatively coupled to both vehicle bus 40 and an entertainment bus (not shown), and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art.

Visual display or touch-screen 50 is preferably a graphics display and can be used to provide a multitude of input and output functions. Display 50 can be a touch-screen on the instrument panel that is capable of graphically presenting a menu (or graphical menu) and capable of receiving input (or other feedback) from a vehicle user. In other embodiments, the display 50 can be a heads-up display reflected off of the windshield or a projector that can project graphics for viewing by a vehicle occupant. The display 50 can be included as a part of a center console of the vehicle, such as a center console entertainment system of the vehicle. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include the telematics unit 42 in vehicle 12 and/or the HWD 90). The carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown in FIG. 1) can be used for one or more purposes, such as for providing backend vehicle connectivity for the vehicle 12. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving vehicle sensor data (or other data), as well as setting up and/or configuring subscriber preferences or controlling vehicle functions; a car sharing server which coordinates registrations from a plurality of users who request to use a vehicle as part of a car sharing service; or a third party repository to or from which vehicle sensor data or other information is provided, whether by communicating with the vehicle 12, remote facility 80, or both. A computer 78 can also be used for providing Internet connectivity such as DNS services or as a network address server that uses DHCP or other suitable protocol to assign an IP address to vehicle 12.

Vehicle backend services facility 80 is a remote facility, meaning that it is located at a physical location that is located remotely from vehicle 12. The vehicle backend services facility 80 (or "remote facility 80" for short) may be designed to provide the vehicle electronics 20 with a number of different system back-end functions through use of one or more electronic servers. And, in many embodiments, the remote facility 80 can include vehicle backend services servers 82 and databases 84, which may be stored on a plurality of memory devices. Also, the remote facility 80 can include one or more switches, one or more live advisors, and/or an automated voice response system (VRS), all of which are known in the art. The vehicle backend services facility 80 may include any or all of these various components and, preferably, each of the various components are coupled to one another via a wired or wireless local area network. The remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices.

Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives. In one embodiment, the databases 84 can store remote data connectivity subscription information that includes records of whether a particular vehicle or vehicle user is associated with a remote data connectivity subscription and/or whether the associated remote data connectivity subscription is active or inactive.

The remote facility 80 can use the information stored in databases 84 to carry out one or more embodiments of the method(s) discussed herein, as well as various other vehicle backend services functionality. As mentioned above, although only a single vehicle backend services facility 80 is illustrated, numerous vehicle backend services facilities can be used and, in such a case, the functionality of the numerous vehicle backend services facilities can be coordinated so that the vehicle backend services facilities can act as a single backend network or so that the operation of each facility is coordinated with the operation of the other facilities. And, the servers 82 can be used to provide information stored in the databases 84 to various other systems or devices, such as the vehicle 12.

The handheld wireless device (HWD) 90 is a SRWC device (i.e., a device capable of SRWC) and may include: hardware, software, and/or firmware enabling cellular telecommunications and SRWC as well as other mobile device applications, such as a vehicle management application 92. The hardware of the HWD 90 may comprise: a processor and memory for storing the software, firmware, etc. The HWD processor and memory may enable various software applications, which may be preinstalled or installed by the user (or manufacturer) (e.g., having a software application or graphical user interface (GUI)). One implementation of the application 92 enables a vehicle user to communicate with the vehicle 12 and/or control various aspects or functions of the vehicle, some of which are listed above. Additionally, one or more applications may allow the user to connect with the remote facility 80 or call center advisors at any time. The application 92 can also provide a user interface for controlling various vehicle functionality.

In one particular embodiment, the HWD 90 can be a personal cellular SRWC device that includes a cellular chipset and/or cellular connectivity capabilities, as well as SRWC capabilities. Using a cellular chipset, for example, the HWD can connect with various remote devices, including computers 78 and remote server facility 80, via wireless carrier system 70. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. In many embodiments, the HWD 90 is a personal SRWC device. And, in some embodiments, the HWD 90 does not include a cellular chipset, but is only capable of SRWC communications.

The processor of the HWD 90 can be any type of device capable of processing electronic instructions including microprocessors, microcontrollers, host processors, controllers, vehicle communication processors, and application specific integrated circuits (ASICs). The processor executes various types of digitally-stored instructions, such as software or firmware programs stored in memory of the HWD 90, which enable the device 90 to provide a wide variety of functionality. For instance, in one embodiment, the processor can execute programs (e.g., the vehicle management application 92) or process data. In some embodiments, the HWD 90 can be a smartphone or tablet that includes an operating system, such as Android™, iOS™, Microsoft Windows™, and/or other operating systems. The memory of the HWD 90 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives. In one embodiment, the memory of HWD 90 may be a non-volatile memory card, such as a Secure Digital™ (SD) card, that is inserted into a card slot of HWD 90.

The HWD 90 can also include a short range wireless communications (SRWC) circuit and/or chipset as well as one or more antennas, which allows it to carry out SRWC, such as any of the IEEE 802.11 protocols, Wi-Fi™, WiMAX™, ZigBee™, Wi-Fi Direct™ Bluetooth™, or near field communication (NFC). The SRWC circuit and/or chipset may allow HWD 90 to connect to another SRWC device. Additionally, HWD 90 can include a cellular chipset thereby allowing the device to communicate via one or more cellular protocols, such as GSM/GPRS technology, CDMA or CDMA2000 technology, and LTE technology. The HWD 90 may communicate data over wireless carrier system 70 using the cellular chipset and an antenna.

Figure 2:
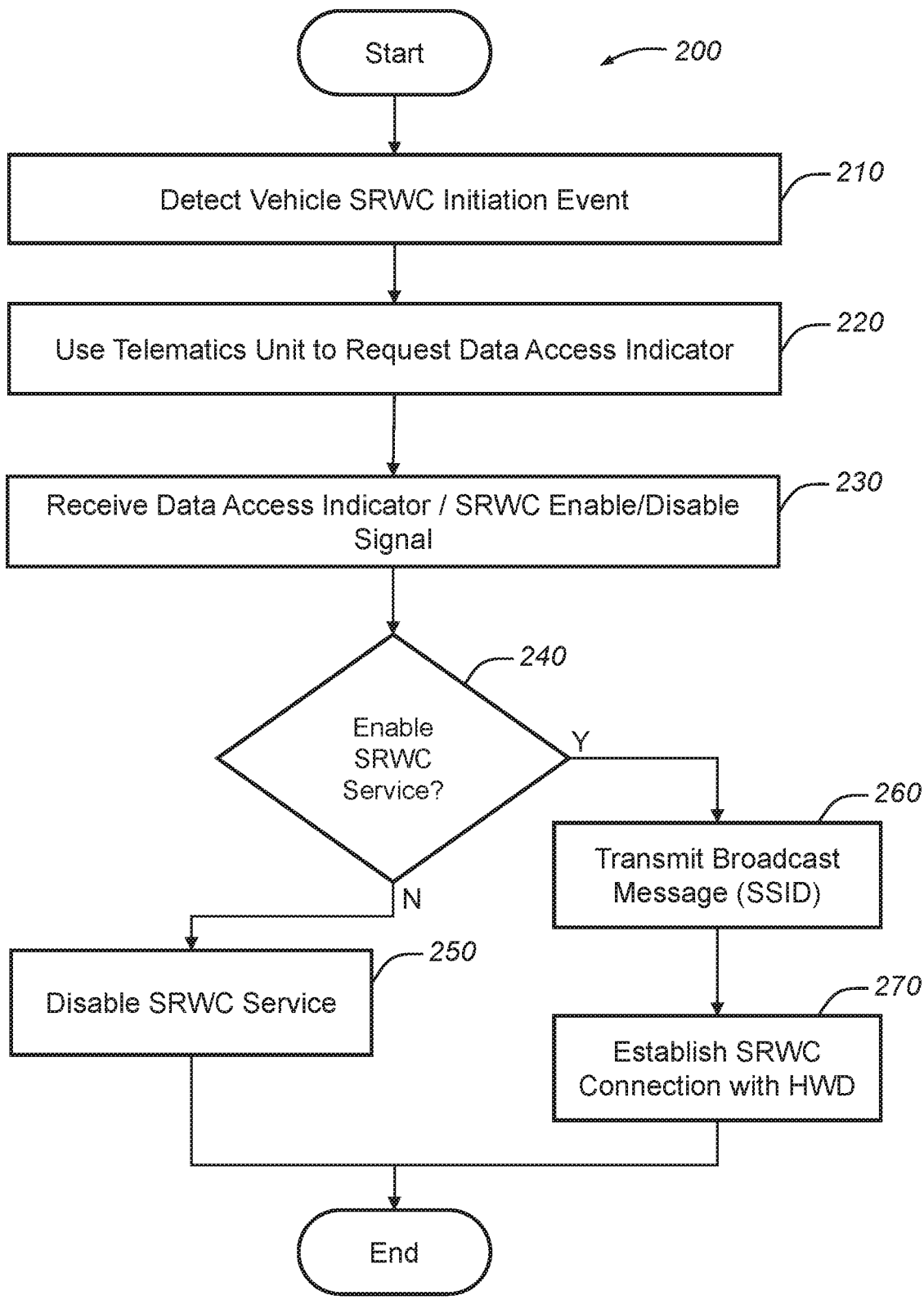
FIG. 2 is a flowchart of an embodiment of a method of managing short-range wireless communications (SRWC) at a vehicle.

With reference to FIG. 2, there is shown an embodiment of a method 200 of managing short-range wireless communications (SRWC) at a vehicle. In one embodiment, the method 200 can be carried out by the vehicle electronics 20 of the vehicle. And, in some embodiments, the method 200 can be carried out by the wireless communications device 30, or at least in part by the wireless communications device 30. Although the steps of the method 200 are described as being carried out in a particular order, it is hereby contemplated that the steps of the method 200 can be carried out in any technically feasible order as will be appreciated by those skilled in the art.

In one scenario, the vehicle 12 and the HWD 90 can be paired with one another so that the vehicle 12 (e.g., the wireless communications device 30) and the HWD 90 can establish a SRWC connection. And, in at least some embodiments, this SRWC pairing can enable the HWD 90 and the vehicle 12 to establish the SRWC connection without intervention by a vehicle user. Although this automatic SRWC connection establishment can be useful in some scenarios, in other scenarios this automatic SRWC connection may not be desired. For example, the HWD 90 and the vehicle 12 may initially be paired using SRWC during a time when a vehicle user (or the vehicle) has an active remote data connectivity subscription such that the vehicle provides the HWD 90 with remote data connectivity via use of the SRWC circuit 32 and the cellular chipset 34, for example. During periods in which this subscription is active, the automatic connection may be desirable. However, the subscription may become inactive due to the subscription period lapsing (e.g., a trial period expiring, non-payment of subscription fees, cancellation of the subscription) and, in some scenarios, the SRWC connection between the HWD 90 and the vehicle may not be desired. In such scenarios, it may be desirable to forgo automatically establishing a SRWC connection between the HWD 90 and the vehicle 12. In at least some embodiments, the method 200 below can address such scenarios described above.

The method 200 begins with step 210, wherein a vehicle short-range wireless communication (SRWC) initiation event is detected. A vehicle SRWC initiation event is any event that indicates or causes the wireless communications device (or other vehicle SRWC device) to power on or become active (e.g., switch into a normal operating mode from a low power mode). In one embodiment, a vehicle state change from a powered off state to a powered on state is detected by the ECM 26 and/or the BCM 24 of the vehicle. For example, the BCM 24 can be coupled to an ignition unit that detects the position of a vehicle key, such as whether the vehicle key is in the "OFF", "ON", "START", or "ACC" (accessory) position. In one embodiment, when the vehicle key is turned to the ACC position from the OFF position, some or all of the vehicle electronics 20 may power on and/or switch from a low-power mode to a normal or regular power mode, including the wireless communications device 30. Thus, since this change in vehicle key position causes the wireless communications device 30 to become active (e.g., power on, switch from low-power to normal power mode), detecting the change in vehicle key position can be considered detecting a vehicle SRWC initiation event.

In another embodiment, the vehicle may receive an indication that a user (or vehicle operator) is approaching the vehicle, such as via detection of a passive key using a passive entry passive start (PEPS) module (or the SRWC circuit 32) of the vehicle electronics. In one embodiment, a PEPS signal is received at the PEPS module indicating that a user with a PEPS key is approaching the vehicle. In another embodiment, a BLE signal is received or detected at the SRWC circuit 32 of the wireless communications device 30. In either of these embodiments, this detection of the user can cause the wireless communications device 30 to become active, and can thus be considered a vehicle SRWC initiation event. In another embodiment, the vehicle SRWC initiation event is detected by the vehicle receiving an indication from a SRWC device (e.g., the HWD 90) that the SRWC device desires to establish a connection with the vehicle using SRWC. Once a vehicle SRWC initiation event is detected, the method 200 continues to step 220.

In step 220, the vehicle sends a user data stream availability request to a remote facility. In many embodiments, the user data stream availability request is sent in response to detecting the vehicle SRWC initiation event. In some embodiments, the user data stream availability request is sent over the wireless carrier system 70 using the telematics unit 42 (e.g., using the cellular chipset 34 of the wireless communications device 30) installed as a part of the vehicle electronics 20 of the vehicle 12. In at least some embodiments, the user data stream availability request can be a request for an indication as to whether the vehicle can provide a non-vehicle device with remote data connectivity. For example, a vehicle or a vehicle user can be associated with a remote data connectivity subscription and, when a vehicle or vehicle user is presently associated with a remote data connectivity subscription (i.e., the subscription is active), the vehicle can be used to provide remote data connectivity to SRWC devices of the user (e.g., non-vehicle SRWC devices). In one embodiment, the user data stream availability request can include a vehicle identifier (e.g., a vehicle identification number (VIN)), subscription information (e.g., user credentials, vehicle credentials), or other information that can be used to identify and/or authenticate the vehicle or vehicle user.

The HWD 90 is a non-vehicle device (e.g., a smartphone of the vehicle user) and can include an SRWC circuit so that the HWD 90 and the vehicle 12 can establish a SRWC connection. The SRWC connection can be used by the HWD 90 to download and upload data to remote servers (or other remote devices, networks, etc.) via use of the wireless communications device 30. In many embodiments, the vehicle 12 uses a remote data connection over the wireless carrier system 70 to communicate with the remote servers pursuant to an active remote data connectivity subscription. As mentioned above, when the vehicle or vehicle user is not associated with an active remote data connectivity subscription, it may be desirable to forgo or suspend automatically establishing a SRWC connection between the wireless communications device 30 and the HWD 90. Thus, at last in some embodiments, the user data stream availability request can be sent to the remote facility 80 so that information concerning whether a subscription exists and/or is active, or whether the wireless communications device should be enabled/disabled (e.g., whether the device 30 should connect to the HWD 90), can be requested. The method 200 then continues to step 230.

In step 230, a user data stream availability response is received from the remote facility. In many embodiments, the data connectivity response is received from the remote facility 80 after sending the user data stream availability request to the remote facility (step 220). In at least some embodiments, the user data stream availability response indicates whether to enable or disable use of SRWC communications (or particular SRWC service(s)) at a wireless communications device installed as a part of the vehicle electronics of the vehicle. For example, the user data stream availability response can indicate that the vehicle or vehicle user is not presently associated with an active remote data connectivity subscription and, thus, this can be interpreted by the vehicle 12 as indicating that the SRWC communications (or particular SRWC service(s)) should be disabled at the wireless communications device 30, such as indicating to disable a Wi-Fi™ service or Wi-Fi™ hotspot provided at the wireless communications device 30. And, in other scenarios, the user data stream availability response can indicate that the vehicle or vehicle user is presently associated with an active remote data connectivity subscription and, thus, this can be interpreted by the vehicle 12 as indicating that the SRWC communications should be enabled at the wireless communications device 30.

In some embodiments, the vehicle 12 may use the wireless communications device 30 (including the SRWC circuit 32) for SRWC communications with vehicle system modules (VSMs), such as VSMs 24-28, or may use certain SRWC service(s) for other purposes unrelated or in addition to the remote data connectivity service. Thus, in some embodiments, the user data stream availability response can be interpreted as indicating whether the vehicle should disable or enable the SRWC functionality of the wireless communications device 30 for carrying out communications with non-vehicle SRWC devices, for a particular non-vehicle SRWC device, for carrying out SRWC communications using a particular SRWC technology (or protocol) (e.g., Wi-Fi™), for carrying out SRWC communications with non-vehicle SRWC devices for a particular purpose, or some combination thereof. In many embodiments, however, the user data stream availability response can indicate whether the vehicle or vehicle user is associated with an active remote data connectivity subscription, or whether the wireless communications device 30 should disable/enable certain SRWC communications (or SRWC communications altogether). For example, the remote data connectivity can be provided to the HWD 90 via a Wi-Fi™ connection when the remote data connectivity subscription is active. When the remote data connectivity subscription becomes (or is) inactive, the Wi-Fi™ connection between the wireless communications device 30 and the HWD 90 may not be needed and, thus, the Wi-Fi™ can be disabled. However, other SRWC communications can remain enabled (or unchanged), such as a Bluetooth™ service that allows the HWD 90 to stream music to the vehicle for playback at the audio system 56; in some embodiments, these other SRWC services (e.g., the Bluetooth™ service) can be enabled in response to the detection of the vehicle SRWC initiation event. The method 200 then continues to step 240.

In step 240, it is determined whether the wireless communications device is to be enabled or disabled, or is to remain enabled or disabled. This determination can be made based on the user data stream availability response that is received from the remote facility in step 230. For example, the user data stream availability response may indicate that there is not active remote data connectivity subscription (or that the remote data connectivity subscription is inactive (e.g., expired)) and, thus, it can be determined that the wireless communications device 30 should be disabled, or at least that the wireless communications device 30 (or certain SRWC service(s)) should be disabled with respect to the HWD 90 and/or other non-vehicle SRWC devices. In another example, the user data stream availability response can include an indicator that indicates that the wireless communications device 30 should be disabled with respect to the HWD 90 and/or other non-vehicle SRWC devices. When it is determined that the wireless communications device is to be disabled, or is to remain disabled (either entirely or with respect to the HWD 90 and/or other non-vehicle SRWC devices), the method 200 continues to step 250; otherwise, the method 200 continues to step 260.

In step 250, a short-range wireless communications (SRWC) service of the wireless communications device is disabled (i.e., at least partially disabled). This step can be carried out in response to the determination that there is not an active remote data connectivity subscription associated with (or for) the vehicle or vehicle user. In one embodiment, the SRWC circuit 32 of the wireless communications device 30 can be entirely disabled. In another embodiment, a particular SRWC service of (or offered by) the wireless communications device 30 can be disabled (e.g., disabling or suspending use of a particular SRWC technology or protocol, such as a Wi-Fi™ hotspot or access point (AP)). In yet another embodiment, the SRWC of the wireless communications device 30 can be disabled with respect to a particular SRWC device, or a particular type or class of SRWC devices, such as non-vehicle SRWC devices. In one embodiment, the wireless communications device 30 can be shut-down or set to an inactive mode (e.g., low-power mode, a hold or a park mode in which no data is transmitted). In another embodiment, the wireless communications device 30 can be set to a standby mode, where the wireless communications device 30 does not respond to any connection/data requests (altogether or for a particular SRWC service or technology). In another embodiment, the wireless communications device 30 can include a list or other information indicating which devices are vehicle SRWC devices (or which devices are non-vehicle SRWC devices that were previously associated with the vehicle (e.g., paired with the vehicle)). In yet another embodiment, the wireless communications device 30 can remain active, but without transmitting SRWC connection request message(s) generally or using a particular SRWC technology, without establishing SRWC connections, without transmitting SRWC connection request message(s) to a particular SRWC device or SRWC devices of a particular type (e.g., non-vehicle devices), or without establishing SRWC connection(s) with a particular SRWC device or SRWC devices of a particular type (e.g., non-vehicle devices). The method 200 then ends.

In step 260, a SRWC connection message is transmitted using the wireless communications device. In many embodiments, the SRWC connection message is transmitted when the user data stream availability response indicates to enable use of SRWC communications at the wireless communications device. The SRWC connection message can be a beacon frame, a request-to-connect message (e.g., a connection establishment request), a response message that is sent in response to any of the previous messages/frames, or other messages causing or resulting in data communications being carried out and/or an SRWC connection being established. The beacon frame can be a Wi-Fi™ beacon frame that includes a service set identifier (SSID). In other embodiments, the SRWC connection message can include an identifier of an access point (AP) hosted by the wireless communications device 30 (e.g., the SRWC circuit 32), or another identifier of the vehicle or the wireless communications device 30. The method 200 then continues to step 270.

In step 270, a short-range wireless communication (SRWC) connection is established. In many embodiments, the SRWC connection is established with a non-vehicle device, such as the HWD 90. This SRWC connection can be established using the same SRWC technology or protocol as that which is used in step 260. In one embodiment, the vehicle 12 and the HWD 90 are paired and can include pre-shared or predetermined security (or key) information that can be used to secure the SRWC connection. And, in many embodiments, this pre-shared security information can enable the wireless communications device 30 and the HWD 90 to establish the SRWC connection without user intervention and while providing for secured (e.g., encrypted) communications. In this sense, the HWD 90 and the wireless communications can automatically establish a secure SRWC connection. Once this SRWC connection is established, the HWD 90 can download data from and/or upload data to one or more remote servers or devices. This data can be communicated via the established SRWC connection and via a remote connection between the vehicle (e.g., the cellular chipset 34) and the remote server. The method 200 then ends.

In at least some embodiments, upon the detection of the vehicle SRWC initiation event in step 210, the wireless communications device (or the vehicle) can operate in an initial mode. In some embodiments, this initial mode can prevent transmission of SRWC connection request messages generally, prevent transmission of SRWC connection request messages using a particular SRWC technology (e.g., Wi-Fi™), or can prevent transmitting SRWC connection request messages to a particular SRWC device or a particular class of SRWC devices (e.g., non-vehicle SRWC devices). In such an embodiment, the wireless communications device (in the initial mode) can forgo, inhibit, or operate without transmitting a beacon or request-to-connect message (or a response to a beacon or request-to-connect message from the SRWC device) using the SRWC circuit. However, in some embodiments, the wireless communications device 30 can still carry out normal operations with vehicle SRWC devices such that these connections are not interfered with. In other embodiments, the wireless communications device 30 (or the vehicle 12) can suspend these beacon or request-to-connect (or other SRWC connection request messages) during steps 210, 220, 230, 240, and/or 250. And, in some embodiments, upon reaching step 250, the wireless communications device 30 (or the vehicle 12) can determine not to send a SRWC connection request message at all. Moreover, at least in some embodiments, the SRWC connection request message(s) can be suspended or stalled until step 260, at which time the wireless communications device 30 can transmit the SRWC connection request message(s).

In one embodiment, the method 200 and/or parts thereof can be implemented in one or more computer programs (or "applications", or "scripts") embodied in a computer readable medium and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

In another embodiment, the method 200 can be modified such that the user data stream availability request (step 220) is sent periodically by the vehicle 12, and not necessarily in response to the detected vehicle SRWC initiation event. In another embodiment, instead of sending a user data stream availability request (step 220), the remote facility can monitor remote data connectivity subscription statuses of various vehicles or vehicle users. And, when the remote facility 80 receives an indication that a status of a remote data connectivity subscription has changed, the remote facility 80 can notify the vehicle 12 through use of the land network 76 and/or wireless carrier system 70. The vehicle can then receive a user data stream availability message that is similar in nature to the user data stream availability response of step 230. A current status indicator that indicates the current status of the remote data connectivity subscription can be stored in memory, such as memory 38. Then, the determining step 240 can be carried out based on this message and/or indicator. In one embodiment, the determining step 240 can include inspecting the current status indicator (e.g., through recalling this current status indicator from memory 38) and, in this sense, the determining step 240 is based on the user data stream availability message.

The computer program(s) can be embodied on computer readable media (e.g., memory 38, memory at servers 82), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of managing short-range wireless communications (SRWC) at a vehicle, the method being carried out by vehicle electronics of the vehicle, wherein the method comprises:
   detecting a vehicle SRWC initiation event, the SRWC initiation event being a state transition of the vehicle from a powered off state to a powered on state;
   in response to the detection of the vehicle SRWC initiation event, sending a user data stream availability request to a remote facility, the user data stream availability request being sent over a wireless carrier system using a telematics unit installed as a part of the vehicle electronics of the vehicle;
   after sending the user data stream availability request to the remote facility, receiving a user data stream availability response from the remote facility, wherein the user data stream availability response is generated by the remote facility in response to querying a database as to a status or existence of a remote data connectivity subscription for the vehicle or a vehicle user, the vehicle user being an individual or entity previously associated with the vehicle;
   during a time between the detection of the vehicle SRWC initiation event and the receiving of the user data stream availability response from the remote facility, operating a wireless communication device in an initial mode that suspends or forgoes transmission of SRWC connection message(s) pursuant to a SRWC service, wherein each of the SRWC connection message(s) indicates an availability for an SRWC device to connect to the wireless communications device, and wherein the wireless communications device is installed as a part of the vehicle electronics of the vehicle;

determining whether to enable or disable use of the SRWC service at the wireless communications device based on the user data stream availability response; and when it is determined to enable use of the SRWC service at the wireless communications device, transmitting a SRWC connection message using the wireless communications device pursuant to the SRWC service.

2. The method of claim 1, wherein the vehicle SRWC initiation event is a state transition of the vehicle from a powered off state to an ignition on state.

3. The method of claim 1, wherein the user data stream availability request is sent to the remote facility after establishing a remote data connection with the remote facility, the remote facility being a backend vehicle services facility.

4. The method of claim 1, further comprising the step of initiating the wireless communications device in response to the vehicle SRWC initiation event, and wherein the wireless communications device is initiated into the initial mode such that SRWC communications are suspended.

5. The method of claim 4, wherein the initial mode enables the reception of wireless messages at the wireless communications device using the SRWC service.

6. The method of claim 1, wherein the initial mode includes suspending or forgoing SRWC communications with non-vehicle SRWC devices while carrying out SRWC communications with vehicle SRWC devices.

7. The method of claim 1, wherein the user data stream availability response includes the status or an indicator of the existence of the remote data connectivity subscription for the vehicle or the vehicle user.

8. The method of claim 1, wherein the SRWC connection message includes an identifier of the wireless communications device.

9. The method of claim 8, wherein the SRWC connection message includes a service set identifier (SSID) pertaining to the wireless communications device.

10. The method of claim 9, wherein the SRWC service uses an IEEE 802.11 protocol.

11. The method of claim 10, further comprising the step of providing a second SRWC service during the time between the detecting and receiving steps, wherein the second SRWC service is a Bluetooth™ service.

12. A method of managing short-range wireless communications (SRWC) at a vehicle, the method being carried out by vehicle electronics of the vehicle and the method comprising:

detecting a vehicle SRWC initiation event;

sending a user data stream availability request to a remote facility;

receiving a user data stream availability message from a remote facility, wherein the user data stream availability message is generated by the remote facility based on whether the vehicle or a vehicle user is associated with an active remote data connectivity subscription such that the vehicle is permitted to provide a remote data connectivity stream for a non-vehicle handheld wireless device (HWD) of the vehicle user, wherein the user data stream availability message is a user data stream availability response that is sent after sending the user data stream availability request to the remote facility;

in response to the detection of the vehicle SRWC initiation event, determining whether to enable or disable use of a SRWC service at a wireless communications device based on the user data stream availability message, wherein the wireless communications device is installed as a part of the vehicle electronics of the vehicle;

when it is determined to enable use of the SRWC service at the wireless communications device, transmitting a SRWC connection message as a part of the SRWC service using the wireless communications device; and establishing a SRWC connection with the non-vehicle HWD in response to the transmitting step, and wherein the SRWC connection is secured using pre-shared or predetermined security information, the pre-shared or predetermined security information being known to the non-vehicle HWD and the vehicle electronics prior to carrying out the method.

13. The method of claim 12, wherein the user data stream availability message is received at the vehicle in response to a change in a status of the remote data connectivity subscription, wherein a current status indicator of the status of the remote data connectivity subscription is stored in memory of the vehicle electronics, and wherein the determining step is based on the current status indicator.

14. The method of claim 12, wherein data is downloaded and/or uploaded by the non-vehicle HWD using the SRWC connection and a remote data connection established between a remote server and a telematics unit using a wireless carrier system, the telematics unit being installed as a part of the vehicle electronics of the vehicle.

15. The method of claim 14, wherein the telematics unit and the wireless communications device are incorporated into a single vehicle system module (VSM).

16. The method of claim 15, further comprising the step of when it is determined to enable use of the SRWC service at the wireless communications device, suspending or forgoing all SRWC communications with the non-vehicle HWD while permitting SRWC communications with vehicle SRWC device(s).

17. The method of claim 12, wherein the vehicle SRWC initiation event is detected when a user approaches the vehicle with a passive entry passive start (PEPS) vehicle key or other passive vehicle key.

* * * * *